US008689113B2

(12) United States Patent
Eytchison et al.

(10) Patent No.: US 8,689,113 B2
(45) Date of Patent: Apr. 1, 2014

(54) METHODS AND APPARATUS FOR PRESENTING CONTENT

(75) Inventors: Edward Eytchison, Milpitas, CA (US); Dan M. Phan, San Jose, CA (US); Nisha Srinivasan, Santa Clara, CA (US); Ganesh B. Gopalakrishnan, Sunnyvale, CA (US)

(73) Assignees: Sony Corporation, Tokyo (JP); SonyElectronics Inc., Parkridge, NJ (US)

( * ) Notice: Subject to any disclaimer, the term of this patent is extended or adjusted under 35 U.S.C. 154(b) by 2166 days.

(21) Appl. No.: 10/763,701

(22) Filed: Jan. 22, 2004

(65) Prior Publication Data

US 2005/0166153 A1    Jul. 28, 2005

(51) Int. Cl.
*G06F 3/00*    (2006.01)
(52) U.S. Cl.
USPC .............................. 715/747; 715/866; 725/47
(58) Field of Classification Search
USPC ............................................ 715/747; 725/47
See application file for complete search history.

(56) References Cited

U.S. PATENT DOCUMENTS

| 5,577,232 A | 11/1996 | Priem et al. ................... 395/500 |
| 5,732,275 A | 3/1998 | Kullick et al. |
| 5,764,992 A | 6/1998 | Kullick et al. |
| 5,835,911 A | 11/1998 | Nakagawa et al. |
| 5,848,064 A | 12/1998 | Cowan |
| 5,951,639 A | 9/1999 | MacInnis ...................... 709/217 |
| 6,009,274 A | 12/1999 | Fletcher et al. |
| 6,031,830 A | 2/2000 | Cowan .......................... 370/338 |
| 6,119,165 A | 9/2000 | Li et al. ......................... 709/229 |
| 6,219,698 B1 | 4/2001 | Iannucci et al. |
| 6,253,207 B1 | 6/2001 | Malek et al. .................. 707/104 |
| 6,272,547 B1 | 8/2001 | McWilliams ................. 709/232 |
| 6,275,529 B1 | 8/2001 | Sato |
| 6,308,061 B1 | 10/2001 | Criss et al. .................... 455/418 |
| 6,362,836 B1 | 3/2002 | Shaw et al. |
| 6,377,640 B2 | 4/2002 | Trans |
| 6,493,748 B1 | 12/2002 | Nakayama et al. ........... 709/218 |
| 6,546,554 B1 | 4/2003 | Schmidt et al. |
| 6,615,248 B1 * | 9/2003 | Smith ........................... 709/217 |
| 6,643,506 B1 | 11/2003 | Criss et al. .................... 455/419 |
| 6,708,217 B1 | 3/2004 | Colson et al. |
| 6,735,434 B2 | 5/2004 | Criss et al. .................... 455/418 |
| 6,754,717 B1 | 6/2004 | Day, III et al. ................ 709/248 |
| 6,801,604 B2 | 10/2004 | Maes et al. |
| 6,892,230 B1 | 5/2005 | Gu et al. ....................... 709/220 |
| 6,968,184 B2 | 11/2005 | Criss et al. .................... 455/418 |
| 6,990,498 B2 | 1/2006 | Fenton et al. ................. 707/102 |
| 7,035,879 B2 | 4/2006 | Shi et al. |
| 7,043,477 B2 | 5/2006 | Mercer et al. .................... 707/7 |

(Continued)

OTHER PUBLICATIONS

Howard P. Katseff and Bethany S. Robinson☐☐Predictive Prefetch in the Nemesis Multimedia Information Service☐☐Copyright ACM 1994☐☐p. 201-209.*

(Continued)

*Primary Examiner* — Andrea Long
(74) *Attorney, Agent, or Firm* — Haverstock & Owens LLP

(57) ABSTRACT

Methods and apparatuses are described for organizing audio/visual content and prefetching selected audio/visual content configured to be displayed to a user. In one embodiment, the methods and apparatuses for presenting content identifies a preference corresponding to a user; detects a current display window; and prefetches at least one audio/visual content in response, in part, to the current display window and the preference.

26 Claims, 8 Drawing Sheets

(56) References Cited

U.S. PATENT DOCUMENTS

| | | |
|---|---|---|
| 7,062,515 B1 | 6/2006 | Thomas et al. |
| 7,062,546 B1 | 6/2006 | Kolar et al. .................... 709/220 |
| 7,117,253 B2 | 10/2006 | Nakayama et al. ........... 709/218 |
| 7,117,482 B2 | 10/2006 | Nguyen et al. ................ 717/122 |
| 7,136,934 B2 | 11/2006 | Carter et al. |
| 7,294,056 B2 | 11/2007 | Lowell et al. |
| 7,376,386 B2 | 5/2008 | Phillips et al. ............... 455/3.01 |
| 7,404,142 B1 | 7/2008 | Tischer ........................... 715/247 |
| 7,478,047 B2 | 1/2009 | Loyall et al. |
| 7,668,738 B2 | 2/2010 | Wiggins |
| 2001/0021994 A1* | 9/2001 | Nash ............................... 725/42 |
| 2001/0029178 A1 | 10/2001 | Criss et al. |
| 2001/0042073 A1 | 11/2001 | Saether et al. ................ 707/203 |
| 2002/0013852 A1* | 1/2002 | Janik ............................. 709/231 |
| 2002/0022453 A1 | 2/2002 | Balog et al. |
| 2002/0038319 A1 | 3/2002 | Yahagi .......................... 707/513 |
| 2002/0046278 A1 | 4/2002 | Hays et al. |
| 2002/0059583 A1 | 5/2002 | Kim |
| 2002/0073172 A1 | 6/2002 | Armstrong et al. |
| 2002/0080169 A1* | 6/2002 | Diederiks ...................... 345/744 |
| 2002/0120885 A1 | 8/2002 | Choi et al. |
| 2002/0143819 A1 | 10/2002 | Han et al. ....................... 707/513 |
| 2002/0194309 A1 | 12/2002 | Carter et al. ................... 709/219 |
| 2002/0198962 A1 | 12/2002 | Horn et al. ..................... 709/218 |
| 2003/0041147 A1 | 2/2003 | van den Oord et al. ....... 709/227 |
| 2003/0093488 A1 | 5/2003 | Yoshida et al. ................ 709/213 |
| 2003/0140068 A1 | 7/2003 | Yeung ............................ 707/204 |
| 2003/0163467 A1 | 8/2003 | Cazier ................................ 707/7 |
| 2003/0167318 A1 | 9/2003 | Robbin et al. |
| 2003/0212608 A1 | 11/2003 | Cliff ................................ 705/26 |
| 2004/0039834 A1 | 2/2004 | Saunders et al. .............. 709/231 |
| 2004/0073787 A1* | 4/2004 | Ban et al. ....................... 713/159 |
| 2004/0073901 A1 | 4/2004 | Imamatsu ...................... 717/170 |
| 2004/0088731 A1 | 5/2004 | Putterman et al. |
| 2004/0098379 A1 | 5/2004 | Huang |
| 2004/0103064 A1 | 5/2004 | Howard et al. |
| 2004/0181790 A1 | 9/2004 | Herrick .......................... 717/168 |
| 2004/0194279 A1 | 10/2004 | Roy ................................ 29/464 |
| 2005/0055686 A1 | 3/2005 | Buban et al. ................... 717/170 |
| 2005/0055687 A1 | 3/2005 | Mayer |
| 2005/0066063 A1 | 3/2005 | Grigorovitch et al. |
| 2005/0108754 A1 | 5/2005 | Carhart et al. ................... 725/47 |
| 2005/0267948 A1 | 12/2005 | McKinley et al. ............ 709/217 |
| 2005/0283797 A1 | 12/2005 | Eldering et al. |
| 2006/0002340 A1 | 1/2006 | Criss et al. |
| 2006/0155400 A1 | 7/2006 | Loomis |
| 2007/0011670 A1 | 1/2007 | Nguyen et al. |

OTHER PUBLICATIONS

Abdulmotaleb El-Saddik, Carsten Griwodz, and Ralf Steinmetz Exploiting User Behaviour in Prefetching WWW Documents Lecture Notes in Computer Science vol. 1483 Published 1998 pp. 302-3011.*

Michael Ehrmantraut, Theo Harder, Hartmut Wittig, Ralf Steinmetz "The personal electronic program guide—towards the pre-selection of individual TV programs" CIKM 96, 1996 ACM pp. 243-250.*

Awbrey, Alicia; Spektor, Reena, "Apple Unveils New iPods," 5GB, 10GB and 20GB Versions for Mac & Windows, http://www.apple.com/pr/library/2002/jul/17ipod.html, Jul. 17, 2002, p. 1-3, Macworld Expo, New York.

* cited by examiner

METHODS AND APPARATUS FOR PRESENTING CONTENT

FIELD OF INVENTION

The present invention relates generally to organizing content and, more particularly, to prefetching content.

BACKGROUND

With the proliferation of computer networks, in particular the Internet, there are an increasing number of commercially available audio/visual content items directed for use by individual users. Further, there are a variety of ways to create audio/visual content items through video cameras, still cameras, audio recorders, and the like. There are also many applications available to modify and/or customize audio/visual content.

Individual users have a large number of audio/visual content items available to view, modify, and/or create. With a large number of audio/visual content items available to the user, however, there may be difficulties in finding a specific audio/visual content item and accessing audio/visual content items in a timely manner. For example, finding a particular audio/visual content is often a challenge when the user has access to numerous audio/visual content items. Assuming that the desired audio/visual content is found, making the desired audio/visual content available to the user while minimizing lag time for the user is also a challenge.

There is a need to organize and present these numerous pieces of audio/visual content items in a more efficient manner to individual users.

SUMMARY

Methods and apparatuses are described for organizing audio/visual content and prefetching selected audio/visual content items configured to be displayed to a user. In one embodiment, the methods and apparatuses for presenting content identifies a preference corresponding to a user; detects a current display window; and prefetches at least one audio/visual content in response, in part, to the current display window and the preference.

BRIEF DESCRIPTION OF DRAWINGS

The accompanying drawings, which are incorporated in and constitute a part of this specification, illustrate and explain embodiments of the methods and apparatuses for presenting content. In the drawings.

DETAILED DESCRIPTION

The following detailed description of the methods and apparatuses for presenting content refers to the accompanying drawings. The detailed description illustrates embodiments of the methods and apparatuses for presenting content and is not intended to construct limitations. Instead, the scope of the invention is defined by the claims.

Those skilled in the art will recognize that many other implementations are possible and are consistent with the methods and apparatuses for presenting content.

References to "content" includes data such as audio, video, text, graphics, and the like, that are embodied in digital or analog electronic form. References to "applications" includes user data processing programs for tasks such as word processing, audio output or editing, video output or editing, digital still photograph viewing or editing, and the like, that are embodied in hardware and/or software.

Figure 1:
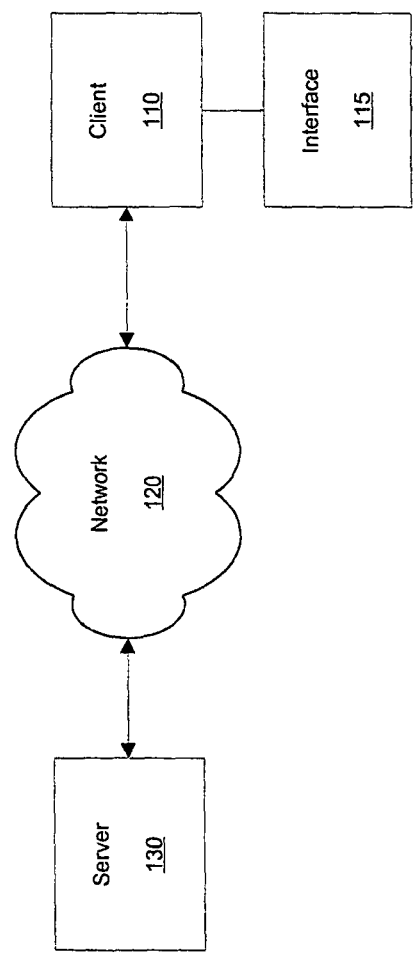
FIG. 1 is a diagram illustrating an environment within which the methods and apparatuses for presenting content are implemented.

FIG. 1 is a diagram illustrating an environment within which the methods and apparatuses for presenting content are implemented. The environment includes an electronic device 110 (e.g., a computing platform configured to act as a client device, such as a personal computer, a personal digital assistant, a cellular telephone, a paging device), a user interface 115, a network 120 (e.g., a local area network, a home network, the Internet), and a server 130 (e.g., a computing platform configured to act as a server).

In some embodiments, one or more user interface 115 components are made integral with the electronic device 110 (e.g., keypad and video display screen input and output interfaces in the same housing as personal digital assistant electronics (e.g., as in a Clie® manufactured by Sony Corporation). In other embodiments, one or more user interface 115 components (e.g., a keyboard, a pointing device (mouse, trackball, etc.), a microphone, a speaker, a display, a camera) are physically separate from, and are conventionally coupled to, electronic device 110. The user uses interface 115 to access and control content and applications stored in electronic device 110, server 130, or a remote storage device (not shown) coupled via network 120.

In accordance with the invention, embodiments of presenting content as described below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
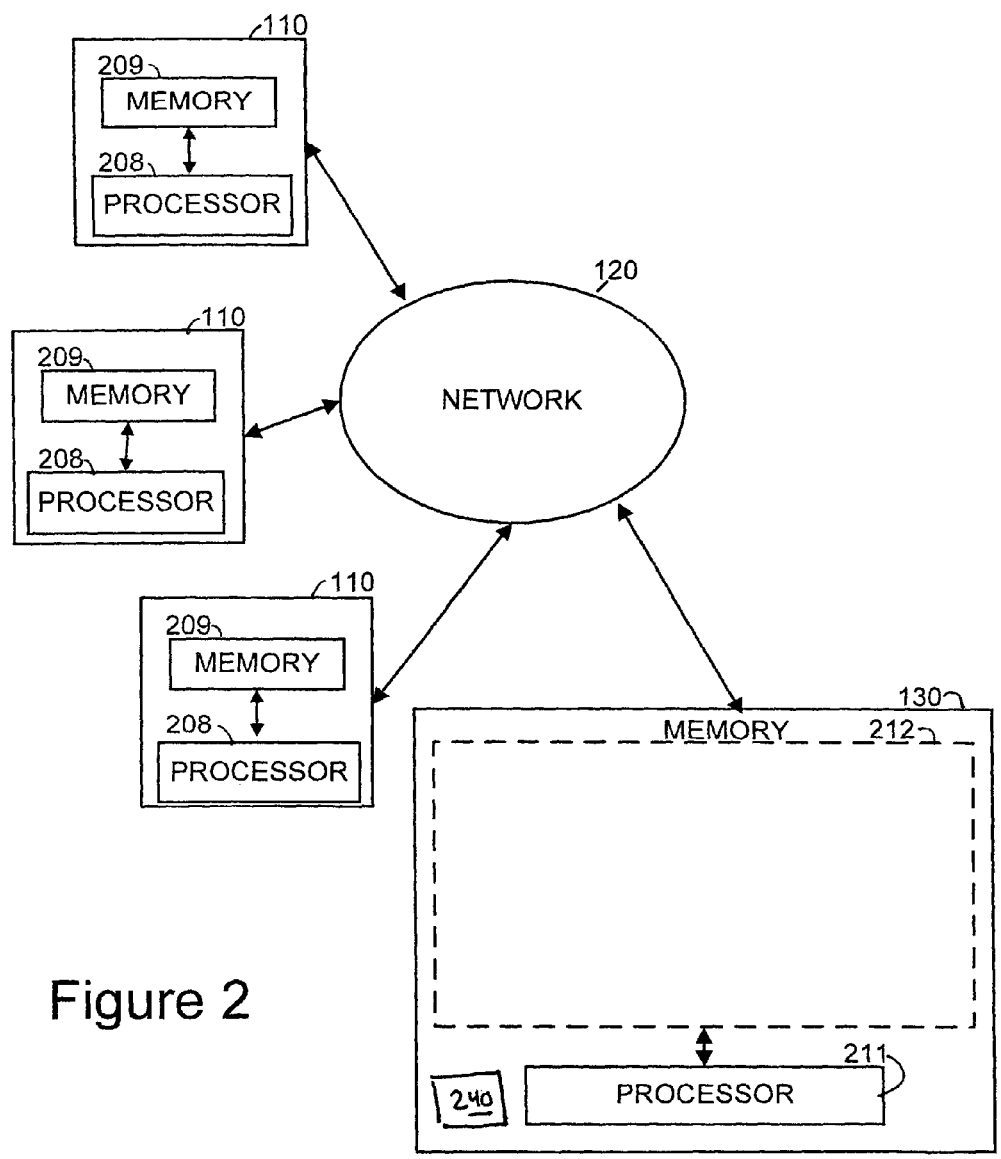
FIG. 2 is a simplified block diagram illustrating one embodiment in which the methods and apparatuses for presenting content are implemented.

FIG. 2 is a simplified diagram illustrating an exemplary architecture in which the methods and apparatuses for presenting content are implemented. The exemplary architecture includes a plurality of electronic devices 110, server 130, and network 120 connecting electronic devices 110 to server 130 and each electronic device 110 to each other. The plurality of electronic devices 110 are each configured to include a computer-readable medium 209, such as random access memory, coupled to an electronic processor 208. Processor 208 executes program instructions stored in the computer-readable medium 209. A unique user operates each electronic device 110 via an interface 115 as described with reference to FIG. 1.

Server 130 includes a processor 211 coupled to a computer-readable medium 212. In one embodiment, the server 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

One or more user applications are stored in media 209, in medium 212, or a single user application is stored in part in one media 209 and in part in medium 212. In one instance a stored user application, regardless of storage location, is made customizable based on presenting content as determined using embodiments described below.

The plurality of client devices 110 and the server 130 include instructions for a customized application for presenting content. In one embodiment, the plurality of computer-readable media 209 and 212 contain, in part, the customized application. Additionally, the plurality of client devices 110 and the server 130 are configured to receive and transmit electronic messages for use with the customized application. Similarly, the network 120 is configured to transmit electronic messages for use with the customized application.

Figure 3:
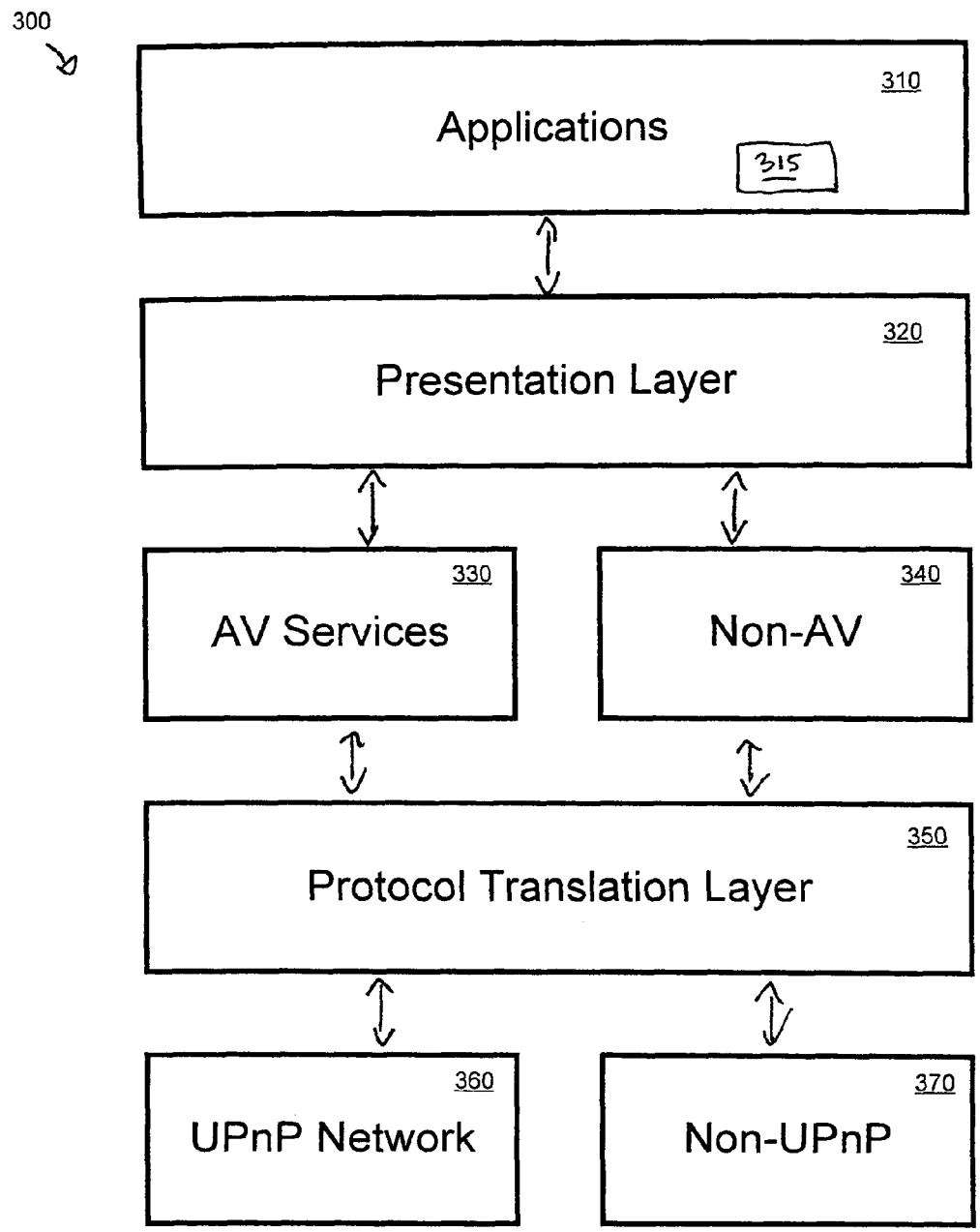
FIG. 3 is a simplified block diagram illustrating an exemplary architecture of the methods and apparatuses for presenting content.

FIG. 3 is a simplified diagram illustrating an exemplary architecture of a system 300. In one embodiment, the system 300 includes applications 310, a presentation layer 320, an audio/visual services module 330, a non-audio/visual services module 340, a protocol translation layer 350, a universal plug and play (e.g. UPnP) network 360, and a non-universal plug and play network 370. Overall, the system 300 is configured to allow the applications 310 to seamlessly interface through the network 360 and the network 370.

In some embodiments, the applications 310 are utilized by a user. In one embodiment, the user is a content developer who creates and/or modifies content for viewing by others. In another embodiment, the user is a content viewer who consumes the available content by accessing the content. In some embodiments, the applications 310 include a prefetch buffer 315 for storing content that is prefetched for use by the content viewer and/or the content developer.

In some embodiments, the presentation layer 320 processes the content information in a suitable format for use by the applications 310. In one instance, the presentation layer 320 takes into account the preferences and use patterns of the particular user. In one embodiment, audio/visual content is pre-sorted according the use patterns of the user. In another embodiment, the audio/visual content is pre-fetched according to the use patterns of the user.

In one embodiment, the presentation layer 320 is configured as a shared library. By utilizing the shared library, the application code is condensed into a smaller size, because multiple applications 310 utilize the same shared library for various commands and instructions.

In some embodiments, the audio/visual service module 330 stores and maintains a representation of device information for devices that correspond to audio/visual services. In one example, audio/visual services include media classifications such as music, videos, photos, graphics, text, documents, and the like. In another example, the audio/visual service module 330 is also configured to store and maintain listings or indices of the audio/visual content that are stored in a remote location.

In one embodiment, the storage locations for the audio/visual content is organized according to the use patterns of the particular user. For example, audio/visual content that is utilized more frequently is stored in locations more quickly accessible to the system 300.

In one embodiment, the non-audio/visual service module 340 stores and maintains a representation of device information for devices that correspond to non-audio/visual services. Non-audio/visual services includes printing services, faxing services, and the like. In another embodiment, the non-audio/visual service module 340 also stores and maintains listings or indices of the non-audio/visual content that are stored in a remote location.

In some embodiments, the protocol translation layer 350 translates at least one underlying protocol into a common application programming interface suitable for use by the applications 310, the presentation layer 320, the audio/visual service module 330, and/or the non-audio/visual service module 340. For example, the protocol translation layer 350 translates the UPnP protocol from the UPnP network 360 into the common application programming interface. In one embodiment, the protocol translation layer 350 handles the translation of a plurality of protocols into the common application programming interface.

In some embodiments, the protocol translation layer 350 supports more than one network protocol. For example, the protocol translation layer 350 is capable of storing more than one translation modules for translating commands in another protocol into the common application programming interface.

In other embodiments, the protocol translation layer 350 retrieves an appropriate translation module in response to the protocol to be translated. For example, the appropriate translation module resides in a remote location outside the system 300 and is retrieved by the protocol translation layer 350.

In one embodiment, the translation modules are stored within the protocol translation layer 350. In another embodiment, the translations modules are stored in a remote location outside the system 300.

In one embodiment, the UPnP network 360 is configured to utilize a protocol established by UPnP.

In one embodiment, the non-UPnP network 370 is configured to utilize a protocol established outside of UPnP. For example, Samba and Server Message Block are protocols which are not related to UPnP.

In one embodiment, the system 300 is shown with the applications 310 logically connected to the presentation layer 320; the presentation layer 320 logically connected to the audio/visual services module 330 and the non-audio/visual services module 340; modules 330 and 340 connected to module 350; and the protocol translation layer 350 logically connected to the UPnP network 360 and the non-UPnP network 370.

The distinction between the UPnP network 360 and the non-UPnP network 370 is shown as one possible example for the method and apparatus for presenting content. Similarly, the distinction between the audio/visual services module 330 and the non-audio/visual services module 340 is shown as one possible example for the method and apparatus for presenting content.

Figure 4:
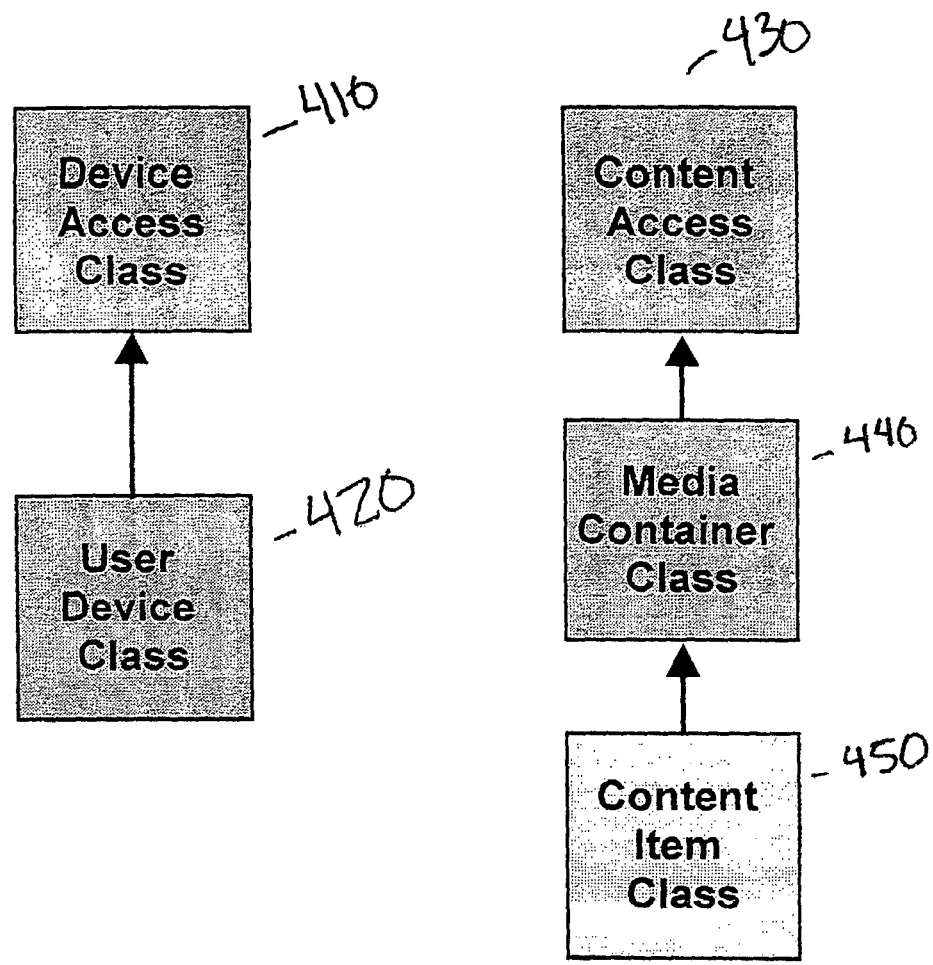
FIG. 4 is a simplified block diagram illustrating an exemplary embodiment of classes in which the methods and apparatuses for presenting content are implemented.

FIG. 4 is a simplified block diagram illustrating exemplary services, devices, and content organized into classes. In one embodiment, these classes are utilized by the system 300 to encapsulate and categorize information corresponding to unique content, devices, or network services relating to the presentation layer 320.

In one embodiment, the classes include both device classes and content classes. The device classes allow devices across heterogeneous networks to be managed and display of information regarding the devices. The content classes are configured to manage the audio/visual content, pre-fetch audio/visual content, and organize the audio/visual content based on user patterns.

Device classes include a device access class 410 and a user device class 420. Content classes include a content access class 430, a media container class 440, and content item class 450.

There are a variety of commands the group devices within the device access class 410. In one embodiment, the device access class 410 devices are grouped using a GetDeviceList command that retrieves a list of devices across at least one network protocol. This list of devices can be further filtered and searched based on the device type and the content type. For example, device types include audio display, video display, audio capture, video capture, audio effects, video effects, and the like. In one embodiment, content types include documents, videos, music, photo albums, and the like.

In one embodiment, the device access class 410 devices are grouped using a SetDeviceFinderCallback command that establishes a callback function when the GetDeviceList command is completed. The SetDeviceFinderCallback command can also be utilized to discover a device asynchronously.

In one embodiment, the device access class 410 devices are grouped using a GetDefaultDevice command that initializes a specific device as a default for a particular device type or content type. In one embodiment, there can be more than one default device for each type of content or device.

In one embodiment, the device access class 410 devices are organized using a Hide/ShowDevice command that either removes a device from view or exposes hidden devices.

In one embodiment, the device access class 410 devices are organized using a SortDevice command that sorts devices based on alphabetical order, device type, supported content type, and the like.

In one embodiment, the user device class 420 devices are grouped using a GetDeviceByName command that searches the entire network for a specific device. In one embodiment, the specific device is identified through a device identifier that is unique to each device, such as a device serial number. In another embodiment, the specific device is identified through a name associated with the device.

The content access class 430 assists in facilitating searches, discovery, and organization of content. In one embodiment, the content access class 430 content is grouped using a PrefetchContentList command that builds a content list based on preference information corresponding to a particular user. In one embodiment, the preference information is stored within the system 300. For example, the PrefetchContentList command is initiated when a particular user is identified. In another embodiment, the PrefetchContentList command us initiated and updated during a session with the same user. In some embodiments, prefetching content is performed based on the preferences stored within the content list.

In one embodiment, the content access class 430 content is grouped using a GetContentList command that returns a content list of content items. For example, these content items are located at addresses in multiple networks and are stored in numerous different storage devices. In one instance, these content items each come from different storage devices such as media containers.

In one embodiment, the content list is obtained in multiple segments. In another embodiment, the content list is obtained in a single segment. In one embodiment, the content list includes a reference to the location of the content and/or additional details describing the device that stores the content.

In one embodiment, the content access class 430 content is grouped using a GetContentByGenre command that retrieves content items according to a specific content genre. For example, in some instances the content items within the requested genre are located in multiple media containers.

In one embodiment, the content access class 430 content is grouped using a GetMediaContainers command that retrieves specified media containers based on a search criteria and the content within the media containers. For example, each media container is defined by a genre type or an artist. If the genre is specified, the media containers that are associated with this specified genre are identified. Further, the individual content items are also specifically identified if they are within the specified genre.

In one embodiment, the content access class 430 content is grouped using a GetDefaultGenre command which initializes specific genre as a default for a particular user. For example, content items which match the specific genre are highlighted on the content list and are prefetched from their respective media containers in response to the particular user.

The media container class 440 provides tools for managing content lists in class 430. In one instance, these content lists are managed by the media containers. In one embodiment, the media container class 440 groups media containers by a GetMediaContainerID command which allows all media containers to be referenced by a unique media container identification. This command provides the unique identification to each media container.

In one embodiment, the media container class 440 groups media containers by a GetMediaContainerName command which, in turn, allows the media container to be referenced by a descriptive name. For example, a descriptive name includes "family room music", "home videos", and the like.

The content class 450 provides tools for representing individual content items. In one embodiment, individual content items are represented in content lists. In one embodiment, the content class 450 content items are grouped using a GetContentID command that allows all individual content items to be referenced by a unique media content identification. This command provides the unique identification to each individual content item.

In one embodiment, the content class 450 content are grouped using a GetContentTitle command that returns the title of the individual content items.

Figure 5:
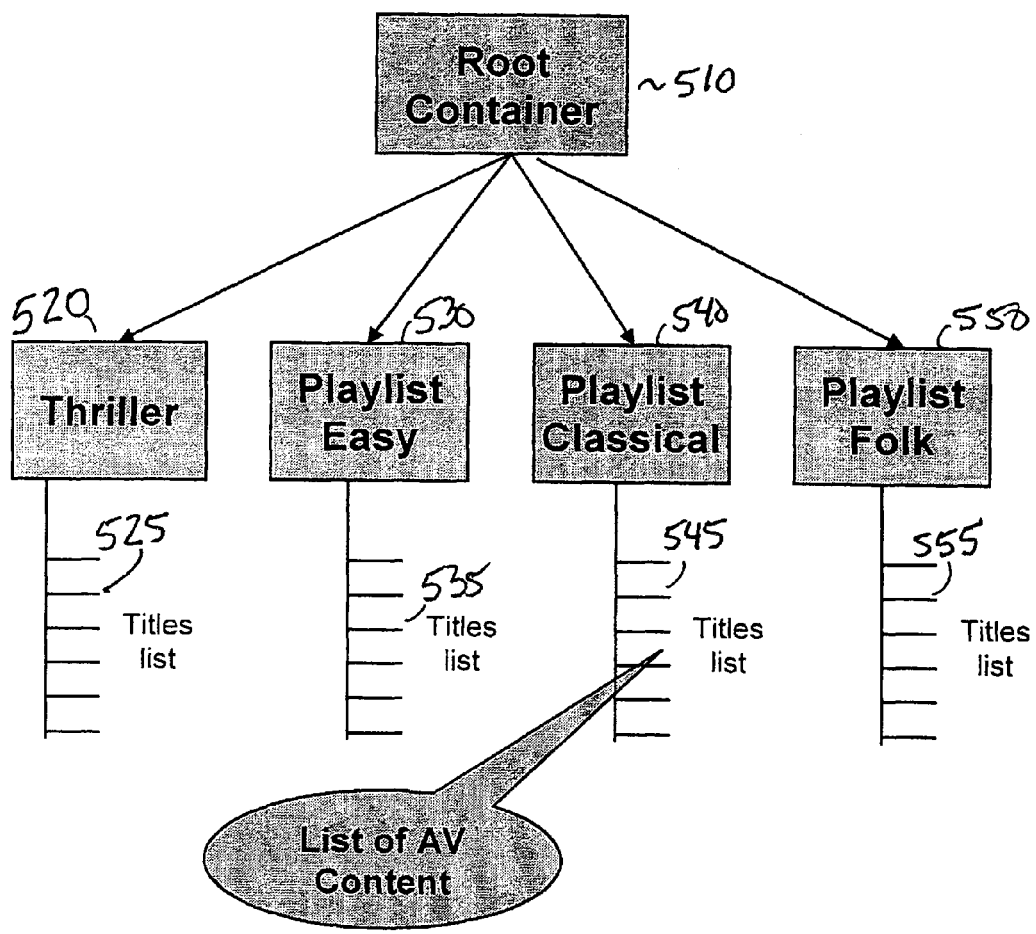
FIG. 5 is a simplified block diagram illustrating an exemplary media container system of the methods and apparatuses for presenting content.

FIG. 5 is a simplified block diagram illustrating an exemplary media container system 500. In one embodiment, a media container stores content. In another embodiment, a media container stores a list representing content. In one embodiment, the media container system 500 includes a root media container 510, a thriller media container 520, an easy media container 530, a classical media container 540, and a folk media container 550. In some embodiments, the media containers allow audio/visual content to be prefetched and available for a user.

In one embodiment, the media containers 510, 520, 530, and 540 are similar to folders on a conventional computer system and are configured to link to other media containers and/or provide a representation of audio/visual content.

For example, the root media container 510 is logically connected to the thriller media container 520, the easy media container 530, the classical media container 540, and the folk media container 550. Each of the media containers 520, 530, 540, and 550 include title lists 525, 535, 545, and 555, respectively. Each title list includes a listing representing various audio/visual content.

Figure 6:
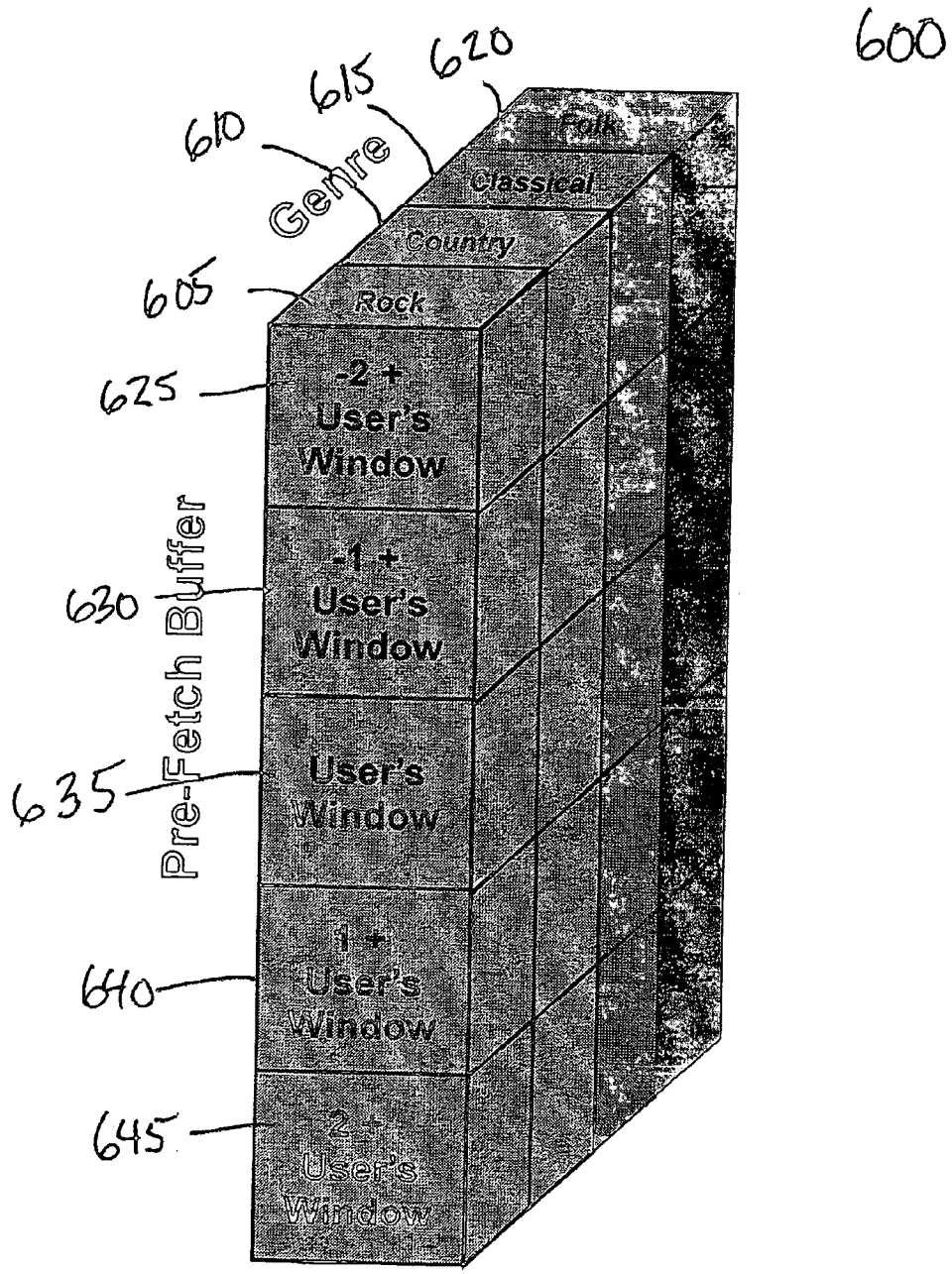
FIG. 6 is a diagrammatic view illustrating a media display representing display windows and genre categories.

FIG. 6 is a simplified block diagram illustrating a media display diagram 600 representing display screens and genre categories. The media display diagram 600 includes a plurality of genres 605, 610, 615, and 620; and a plurality of display windows 625, 630, 635, 640, and 645. Each genre represents content that is represented within each of the display windows.

For example, within the rock music genre 605, many different pieces of rock music content are displayed within each of the display windows 625, 630, 635, 640, and 645. In this example, display window 635 is the current display window (n window). Similarly, the display window 630 is the n−1 window; the display window 625 is the n−2 window; the display window 640 is the n+1 window; and the display window 645 is the n+2 window, where n represents the current display window.

In this example, audio/visual content is represented within the display windows. In one embodiment, the audio/visual content is represented in list, icon, and/or thumbnail form. In some instances, a user selects the audio/visual content represented in the display windows.

To minimize the wait time of utilizing the selected audio/visual content, the method and apparatus for presenting content prefetches the audio/visual content based, in part, on the location of the particular audio/visual content listing relative to the listings displayed in current display window 635. For example, if the methods and apparatuses for presenting content are configured to prefetch audio/visual content within the current display window 635, then the audio/visual content represented within the display windows 625, 630, 640, and 645 are prefetched. As the user scrolls through the various display windows, the prefetched audio/visual content dynamically changes. In one illustrative employment, content items that correspond to each content item listing displayed in n+/−1 windows are prefetched, where n=1. In some embodiments, the prefetched content represented in the display windows 625, 630, 640, and 645 are temporarily stored within the prefetched buffer 315.

In some embodiments, the content represented within the display windows 625, 630, 640, and 645 is determined through preferences associated with the particular user. For example, in some instances, content such as a particular folk song is selected for the current display window 635, and content for the display windows 625, 630, 640, and 645 is automatically selected based on the user's preferences and the particular folk song that is selected for the current display window 635.

Figure 7:
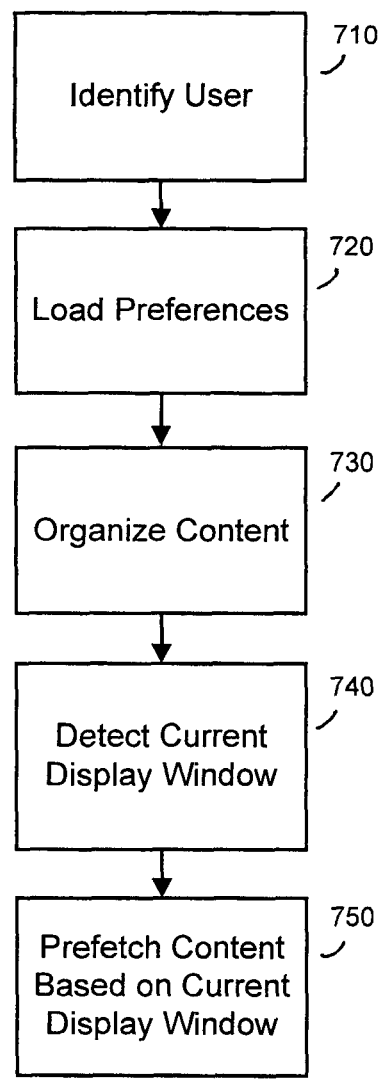
FIG. 7 is a flow diagram illustrating a prefetching process, consistent with one embodiment of the methods and apparatuses for presenting content.
Figure 8:
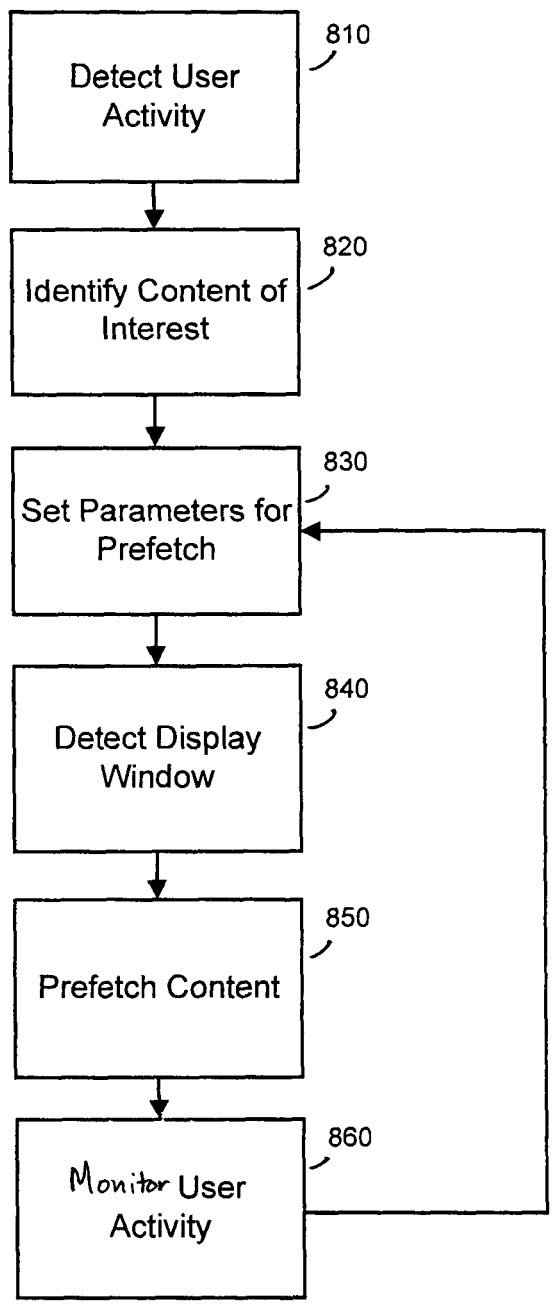
FIG. 8 is a second flow diagram illustrating a prefetching process, consistent with one embodiment of the methods and apparatuses for presenting content.

The flow diagrams as depicted in FIGS. 7 and 8 are exemplary embodiments of the methods and apparatuses for presenting content. In each embodiment, the flow diagrams illustrate various applications corresponding with the system 300.

The blocks within the flow diagram may be performed in a different sequence without departing from the spirit of the method and apparatus for presenting content. Further, blocks may be deleted, added, or combined without departing from the spirit of the methods and apparatuses for presenting content.

FIG. 7 is a flow diagram that illustrates prefetching content to provide access to content through the system 300.

In Block 710, the identity of the user is detected. In one embodiment, the identity of the user is authenticated through the use of a password, a personal identification number, a biometric parameter, or the like.

In Block 720, a preference is loaded corresponding to the user. For example, the preference includes parameters such as genre selections, and play lists. These parameters are detected through the actions of each user. Accordingly, the preference is unique to each particular user in one embodiment.

In Block 730, audio/visual content is organized. In some embodiments, the audio/visual content is grouped and organized according to various classes and commands as discussed above with reference to FIG. 4. In other embodiments, the audio/visual content corresponds to the play list and preferences associated with the user. For example, in one instance the audio/visual content is organized according to the probability of being utilized by the user based on the current display window 635 as graphically shown in FIG. 6.

In Block 740, the current display window is detected. In some embodiments, the current display window is represented by content presently viewed by the user. In other embodiments, the current display window is represented by the content that is selected by the user.

In Block 750, audio/visual content is prefetched for utilization by the user. Based, in part, on the preferences and content representing the current display window, a range of audio/visual content is prefetched. For example, the audio/visual content that is represented within n windows of the current display window may be prefetched. The number n can be any number of windows.

In another embodiment, a different reference may be utilized to prefetch audio/visual content besides display windows.

FIG. 8 is a second flow diagram that illustrates prefetching content to provide access to content through the system 300.

In Block 810, the activity of the user is detected. For example, the frequency in which a user scrolls through the display windows, the frequency in which the user changes audio/visual content selections, and the frequency in which the user selects particular audio/visual content selection are measured.

In Block 820, the audio/visual content of interest is identified. In one embodiment, the audio/visual content is grouped and organized according to various preferences through classes and commands as discussed above with reference to FIG. 4. In another embodiment, in addition, the media containers and associated play lists, as discussed above with reference to FIG. 5, are utilized to identify content associated with the user. For example, the audio/visual content is organized according to the probability of being utilized by the user as graphically shown in FIG. 6.

In yet another embodiment, services and/or content are searched by various parameters. Exemplary parameters are found in the description of the different classes illustrated in FIG. 4. In one embodiment, content is identified and filtered through these various parameters including, but not limited to, device/service availability, associated protocol, type of service, type of device, and the like. In another embodiment, these services and/or devices span more than one network and utilize more than one protocol to interface with the content.

In Block 830, parameters are set for the prefetching function. For example, parameters for the prefetching function include the range in which the audio/visual content is prefetched, the frequency in which prefetching occurs, and the sensitivity in responding to user activity.

In one embodiment, the range for prefetching audio/visual content is within one display window. In other embodiments, the range for prefetching may be within any number of display windows. In some embodiments, the actual range of prefetching depends on the user activity detected in the Block 810. In another embodiment, the range for prefetching depends on the size of the content, memory considerations, and user history.

In one embodiment, the frequency of updating the prefetching operation depends on detecting new user activity.

In another embodiment, the frequency of updating occurs at a predetermined time interval, such as every 5 minutes.

In Block 840, the display window is detected.

In Block 850, audio/visual content is prefetched in response to the parameters for the prefetch function and the display window. For example, in some instances audio/visual content that is represented in the display window and within the preset range of the display window as determined by the parameters in the Block 830 is prefetched from the stored locations into the prefetched buffer 315. In some embodiments, the prefetched audio/visual content is available to the user locally within the prefetched buffer 315. By having the prefetched audio/visual content local, there is less delay than if the prefetched audio/visual content had to be transmitted from the original, remote location. In some embodiments, as new content is loaded into the prefetched buffer 315, old content is removed and replaced by the new content based on user preferences, the range, and the current display window.

In Block 860, the user activity is continually monitored. In one embodiment, if there are changes in user activity, the parameters for the prefetch function is reset in the Block 830.

What is claimed:

1. A method comprising:
   identifying a preference and a use pattern corresponding to a user;
   detecting a current display window;
   prefetching at least one audio/visual content in response to the current display window, the preference and the use pattern; and
   setting a prefetch parameter for a frequency of prefetching in response to the preference.

2. The method according to claim 1, further comprising setting a prefetch parameter for a range of display windows in response to the preference.

3. The method according to claim 1, further comprising identifying the user associated with the preference.

4. The method according to claim 1, wherein the audio/visual content includes one of a document, an image, audio data, and video data.

5. The method according to claim 1, wherein the preference includes viewing habits and selected genres.

6. The method according to claim 1, wherein the prefetching further comprises transmitting the audio/visual content to a prefetching buffer.

7. The method according to claim 1, wherein the prefetching further comprises updating the audio/visual content based on the current display window.

8. The method according to claim 1, wherein the preference includes a play list.

9. The method according to claim 1, wherein the preference includes a genre selection.

10. The method according to claim 1, wherein the preference includes a plurality of audio/visual content.

11. The method according to claim 1 wherein the audio/visual content is organized according to the use pattern of the user.

12. The method according to claim 1 wherein the audio/visual content utilized more frequently is stored in a more quickly accessible location.

13. An electronic device-implemented system comprising:
   a processor and a memory, wherein the memory is programmed with instructions comprising an application, and further wherein the memory comprises an application buffer;
   a presentation layer for identifying a preference and a use pattern;
   an audio/visual service module for organizing audio/visual content using a parameter;
   the application for detecting a current display window being displayed on a display;
   the application for prefetching at least one audio/visual content from a memory device into the application buffer in response to the current display window, the preference and the use pattern; and
   the application for setting a prefetch parameter for a frequency of prefetching in response to the preference.

14. A method comprising:
   detecting an activity;
   setting a prefetch parameter based on the detected activity, wherein the prefetch parameter includes a frequency of prefetching;
   detecting a current display window; and
   prefetching a content item based on the prefetch parameter, the current display window and a use pattern.

15. The method according to claim 14, wherein the prefetch parameter includes a range of display windows.

16. The method according to claim 14, further comprising selecting at least one audio/visual content based on a search parameter.

17. The method according to claim 16, wherein the search parameter is a prefetchcontentlist command.

18. The method according to claim 16, wherein the search parameter is a getcontentlist command.

19. The method according to claim 16, wherein the search parameter is a getcontentbygenre command.

20. The method according to claim 16, wherein the search parameter is a getmediacontainer command.

21. The method according to claim 14, further comprising updating the prefetch parameter based on an additional activity.

22. The method according to claim 14, further comprising prefetching at least one additional audio/visual content based on a changing current display window.

23. An electronic device-implemented system comprising:
   a display;
   a media container configured for storing an audio/visual content item;
   a prefetch buffer configured for temporarily storing a prefetched audio/visual content item within a memory device; and
   a presentation layer configured for transmitting the prefetched audio/visual content item to the prefetch buffer based on a user's preference, a current display window and a use pattern, wherein the presentation layer transmits the prefetched audio/visual content item based on a preset frequency of prefetching and further wherein the current display window is displayed on the display.

24. The system according to claim 23, further comprising an application configured to utilize the prefetched audio/visual content.

25. The system according to claim 23, wherein the presentation layer transmits the prefetched audio/visual content item based on a preset range of display windows.

26. A method comprising:
   detecting an activity;
   setting a prefetch parameter based on the detected activity, wherein the prefetch parameter includes a frequency of prefetching;
   detecting a current display window; and
   prefetching a content item based on the prefetch parameter, the current display window and a use pattern at any time and in response to the detected activity.

* * * * *